US005637498A

United States Patent [19]

Ottengraf et al.

[11] Patent Number: 5,637,498
[45] Date of Patent: Jun. 10, 1997

[54] METHOD FOR BIOLOGICAL CLEANING OF A CONTAMINATED GAS FLOW

[75] Inventors: Simon P. P. Ottengraf, Stiphout; Robertus M. M. Diks, Breda; Christianus P. M. van Lith, Soest, all of Netherlands

[73] Assignee: ClairTech B.V., Woudenberg, Netherlands

[21] Appl. No.: 553,250

[22] PCT Filed: May 4, 1994

[86] PCT No.: PCT/NL94/00098

§ 371 Date: Apr. 19, 1996

§ 102(e) Date: Apr. 19, 1996

[87] PCT Pub. No.: WO94/26392

PCT Pub. Date: Nov. 24, 1994

[30] Foreign Application Priority Data

May 14, 1993 [NL] Netherlands ............ 9300838

[51] Int. Cl.⁶ .................... D06M 16/00; C02F 3/00
[52] U.S. Cl. .................... 435/264; 435/266; 210/610; 210/614; 210/615; 210/618
[58] Field of Search ................ 435/264, 266; 210/601, 602, 610, 611, 614, 615, 618

[56] References Cited

U.S. PATENT DOCUMENTS 5,064,763  11/1991  Bonte ........................... 435/266

FOREIGN PATENT DOCUMENTS

| 0357960 | 3/1990 | European Pat. Off. | ........ B01D 53/34 |
| 0422876 | 4/1991 | European Pat. Off. | ........ C02F 3/28 |
| 0440996 | 8/1991 | European Pat. Off. | ........ C02F 3/12 |
| 0456607 | 11/1991 | European Pat. Off. | ........ C02F 3/30 |
| 0470468 | 12/1992 | European Pat. Off. | ........ B01D 53/00 |
| 9307952 | 4/1993 | WIPO | ........ B01D 53/00 |

Primary Examiner—David A. Redding
Attorney, Agent, or Firm—Webb Ziesenheim Bruening Logsdon Orkin & Hansen, P.C.

[57] ABSTRACT

The invention relates to a method for biological cleaning of a gas flow containing at least one contaminant by: i) placing the gas flow containing contamination in contact with liquid, wherein the contamination is absorbed by the liquid and is degraded by micro-organisms in contact with the liquid; and ii) controlling a control salt concentration in the liquid such that the fractional inhibition of the growth rate of the micro-organisms is greater than the fractional decrease in the degradation rate of the contamination, and to the use of a control salt in biological cleaning of such a gas flow.

8 Claims, 8 Drawing Sheets

5,637,498

METHOD FOR BIOLOGICAL CLEANING OF A CONTAMINATED GAS FLOW

FIELD OF THE INVENTION

The present invention related to a method for biological cleaning of a gas flow containing at least one contaminant. The present invention relates more particularly to a method for biological cleaning of a gas flow making use of a liquid containing micro-organisms.

BACKGROUND OF THE INVENTION

Known biological gas purification systems comprise a biowasher, wherein the micro-organisms are dispersed in the liquid, and a so-called biotrickling filter (abbreviated below to BTF), wherein the micro-organisms ore situated at least partially on the packing material.

In the case of a biowasher the micro-organisms degrade the contamination absorbed from the gas flow by the liquid. The micro-organisms herein grow and the quantity of biomass thereby increases. This results eventually in draining of excess biomass.

In the case of a BTF the micro-organisms grow on the packing material in the form of a biofilm. The contaminants from the liquid are absorbed into the liquid which drips along the biofilm and diffuse into the biofilm. The micro-organisms degrade the contaminants and the degradation products such as water, carbon dioxide and occasionally mineral salts or acids, are relinquished to the liquid. This liquid can moreover contain nutrients for the micro-organisms in addition to acid or alkali to buffer the liquid to a neutral pH.

Due to excessive growth the biofilm can increase in size such that this results in an increased pressure drop over the BTF and ultimately even to blocking of the BTF. All kinds of mechanical and chemical procedures are applied to remove at least a part of the biofilm. The micro-organisms are for instance poisoned to enable easier mechanical removal thereof. As a result of the fact that the BTF must be taken temporarily out of service for maintenance, it is necessary to install two BTF installations to enable continuous biological cleaning of a gas flow. An additional problem is that the released biofilm forms waste which has to be processed and discharged separately.

SUMMARY OF THE INVENTION

The invention has for its object to provide a method for biological cleaning of a gas flow, such as for application in a biowasher and a biotrickling filter (BTF), wherein the inherent increase of the biomass as a consequence of the biological degradation of the contamination is to a great extent inhibited, while at the same time degradation of the contamination by the micro-organisms does not decrease, or does so to a much lesser extent.

This is achieved with the method according to the invention for biological cleaning of a gas flow containing at least one contaminant, comprising of:

i) placing the gas flow containing contamination in contact with liquid, wherein the contamination is absorbed by the liquid and is degraded by micro-organisms in contact with the liquid; and ii) controlling a control salt concentration in the liquid such that the fractional inhibition of the growth rate of the micro-organisms is greater than the fractional decrease in the degradation rate of the contamination.

DETAILED DESCRIPTION OF THE INVENTION

Figure 1:
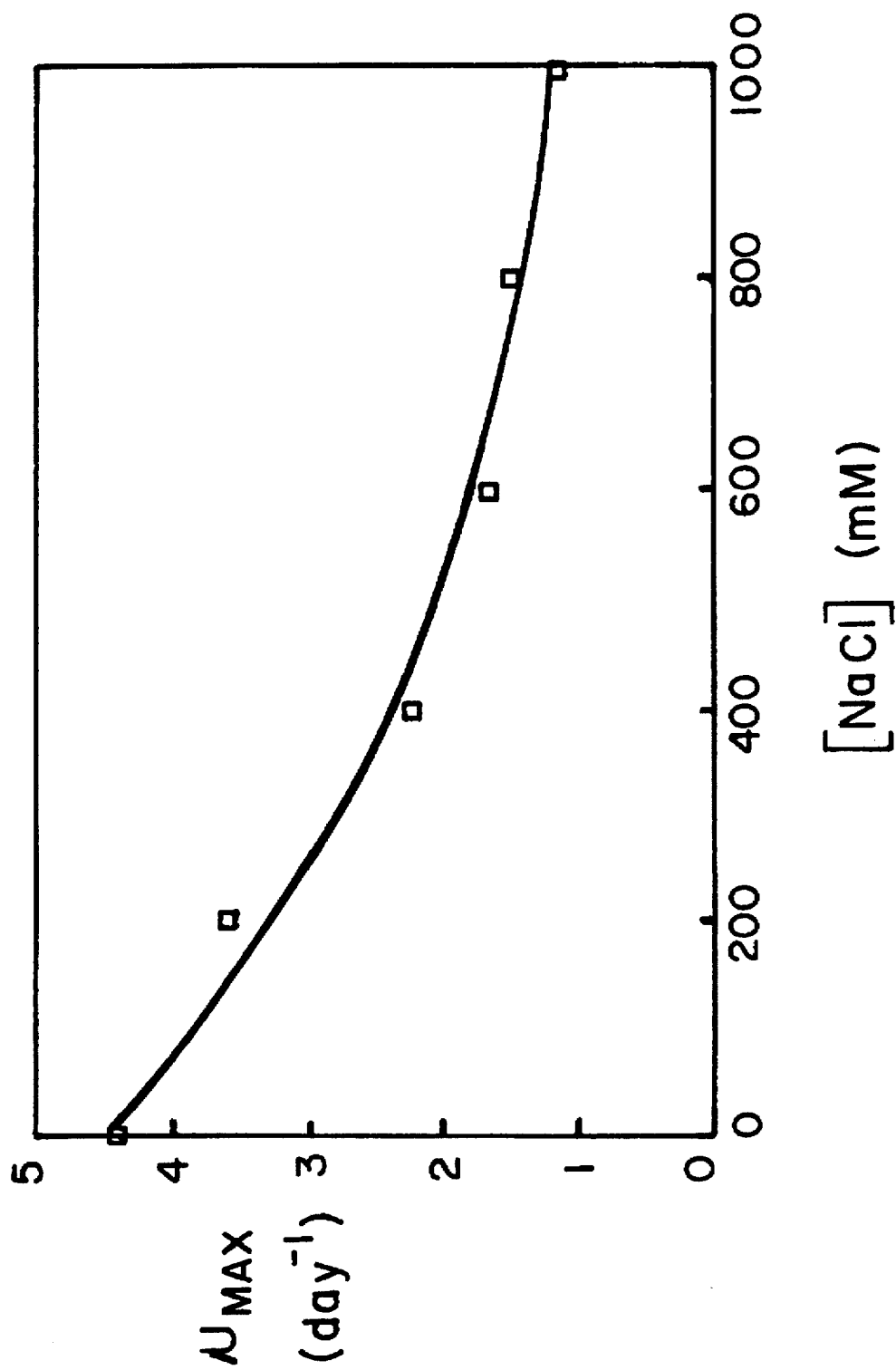
FIG. 1 identifies a maximum growth rate as a function specified process parameter.

The present invention is based on the discovery that the effect of an increasing control salt concentration on the maximum growth rate of micro-organisms differs to a large degree from the effect on the degradation rate of the contamination. By increasing the control salt concentration the inhibition of the growth rate is greater than the fall in the degradation rate. The increase in the biomass can thus be inhibited or stopped, while the rake of degradation of the contamination does not decrease, or decreases to a much lesser degree.

It is noted that, in the case of a comparatively small decrease in the rate of degradation of the contamination, a gas flow can nevertheless he biologically cleaned to the same level by enlarging the biological cleaning capacity (for instance the reactor volume) to a corresponding extent.

Inhibiting of the growth rate of the micro-organisms achieves that in the case of a biological filter the amount of biomass produced decreases considerably and that in the case of a BTF either stoppage can be avoided or the operational duration can be considerably extended.

Understood by fractional inhibition of the growth rate in the context of the present invention is the fraction by which the maximum growth rate decreases by adding a determined concentration of the control salt. Understood by the fractional decrease in the degradation rate is the fraction by which the degradation rate decreases as a result of the adjusted concentration of the control salt.

The ratio (R) of the fractional inhibition to the fractional decrease is greater than 1. The ratio R is preferably greater than 1.3, more preferably greater than 1.5. The ratio generally lies in the range of 1.2 to 10, such as 1.3 to 8, more particularly 1.5 to 8.

A control salt that can be used according to the invention comprises salts of alkali metals such as sodium, earth alkali metals such as calcium and magnesium, and other polyvalent metal ions such as aluminium.

The effect of the control salt depends on the type of micro-organism which is used in single culture, mixed culture or as active sludge. The effect of the control salt further depends on the contamination for degrading. It can be stated generally that polyvalent positive ions produce a greater effect. The control effect of calcium and magnesium is thus greater than for instance that of sodium. From an economic viewpoint however, preference is usually given to addition of sodium salts or compounds. Sodium chloride, sodium sulphate, sodium carbonate and sodium hydroxide for example can therefore be added.

In the case of a BTF the micro-organisms are adhered to a carrier material. Increasing the control salt concentration herein brings about the advantageous effect that the micro-organisms also display a stronger tendency to adhesion to the carrier material. Fewer micro-organisms are therefore present in the drained liquid, whereby separating costs remain limited.

In the case of a biowasher the micro-organisms are dispersed in the liquid.

During degradation of the contamination the degradation products can begin to accumulate in the liquid. In some cases these degradation products have an acidic character, such as is for instance the case in the biological oxidation of halogenated hydrocarbons wherein halogen hydracid is created. The liquid is herein partly recirculated and the other part drained and fresh liquid added in compensation. If the degradation products contain acid or base, a neutralizing compound can be added to the recirculating liquid, whereby the pH is buffered to a determined value and with this addition the control salt is formed in situ. It is thus possible according to the invention to regulate a determined control salt concentration in the liquid by the degree of draining. Regulating of the control salt concentration can thus take place by adding control salt to or draining it from the liquid.

Micro-organisms which are usual and specific to degradation of the contamination can be used in the biological cleaning method according to the invention. Examples are active sludge from a waste water treatment plant, for instance for the degradation of ethanol and methyl methacrylate, Hyphomicrobium for the degradation of dichloromethane, Xanthobacter and Ancylobacter aquaticus for dichloromethane.

Mentioned and other features of the biological cleaning method according to the invention will be further elucidated hereinafter with reference to a number of non-limitative examples given by way of example which are in no way intended to limit the invention thereto.

EXAMPLE 1

Active sludge from a waste water purification plant was used to investigate the effect of the control salt on the growth rate as well as the degradation rate of an ethanol in a watery nutrient solution. A small quantity of active sludge was used to prepare a pro-culture for the biomass in a watery nutrient solution containing 100 mM ethanol. After exhaustion of the carbon source this pre-culture was used as occulent to perform the growth rate and degradation rate experiments at room temperature.

Shaker flasks containing 50 ml of a watery nutrient solution with 5 mM ethanol were inoculated with a number of drops of the prepared pro-culture. Each flask contained a determined amount of control salt in the form of sodium chloride in a concentration of 0 to 1000 mM. The growth rate in the form of formation of biomass was followed during the experiment by measuring the optical density at 450 nm. The $OD_{450}$ was calibrated against distilled water. The growth of the micro-organisms is characterized by the maximum growth rate $P_{max}$, the value of which is determined from the maximum slope of the measured growth curves. FIG. 1 shows the value of the maximum growth rate $P_{max}$ as a function of the NaCl concentration. It can be seen from FIG. 1 that the maximum growth rate of the active sludge suspension is influenced to a great extent by the control salt concentration. The maximum growth rate decreases by about a factor of 4 by increasing the NaCl concentration from 0 to 1000 mM. The ratio R amounts to 1.7 at 400 mM and to 1.9 at 800 mM.

To measure the degradation rate of ethanol shaker flasks were provided with a biomass concentration of about 300 mg dry substance/$dm^3$. The initial ethanol concentration in each shaker flask amounted to roughly 1.5 mM. The control salt concentration in the form of NaCl varied between 0 and 1000 mM.

The specific degradation rate was calculated from the obtained degradation curves by dividing the slope of the degradation curve by the associated concentration of the biomass. The values for this specific degradation rate as a function of the NaCl concentration are shown in FIG. 2.

Figure 2:
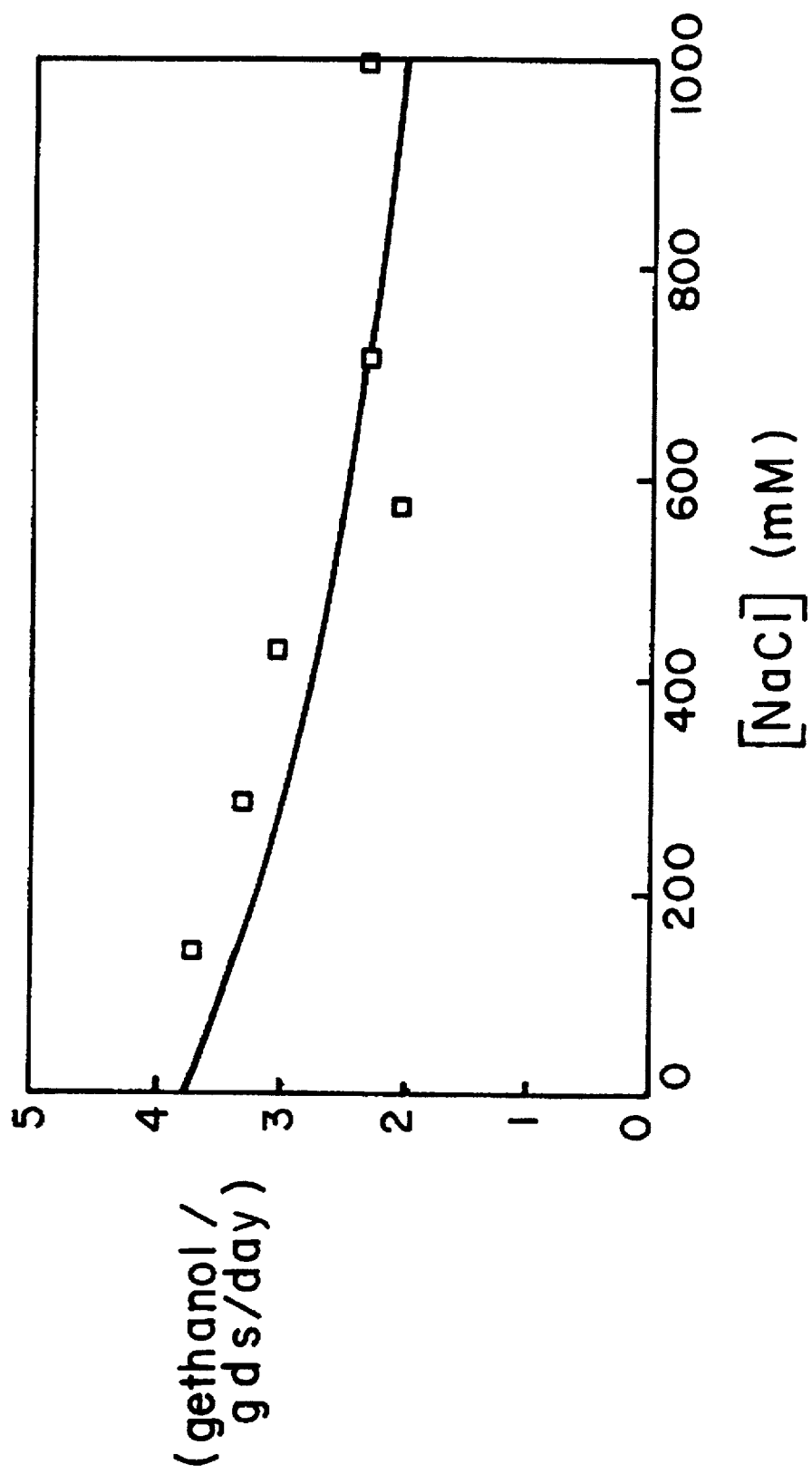
FIG. 2 identifies a degradation rate for ethanol under specified process conditions.

FIG. 2 shows that the specific degradation rate for ethanol decreases slightly with the increasing NaCl concentration. The influence of the control salt on the specific degradation rate is markedly lower than on the maximum growth rate (FIG. 1).

EXAMPLE 2

The same experimental procedures as used in example 1 were carried out with a mixed culture harvested from a BTF which is used on laboratory scale to degrade a gas flow containing methyl methacrylate. The biological flora present as biofilm on the packing material of the BTF had developed from an active sludge suspension with which the BTF was initially inoculated.

Figure 3:
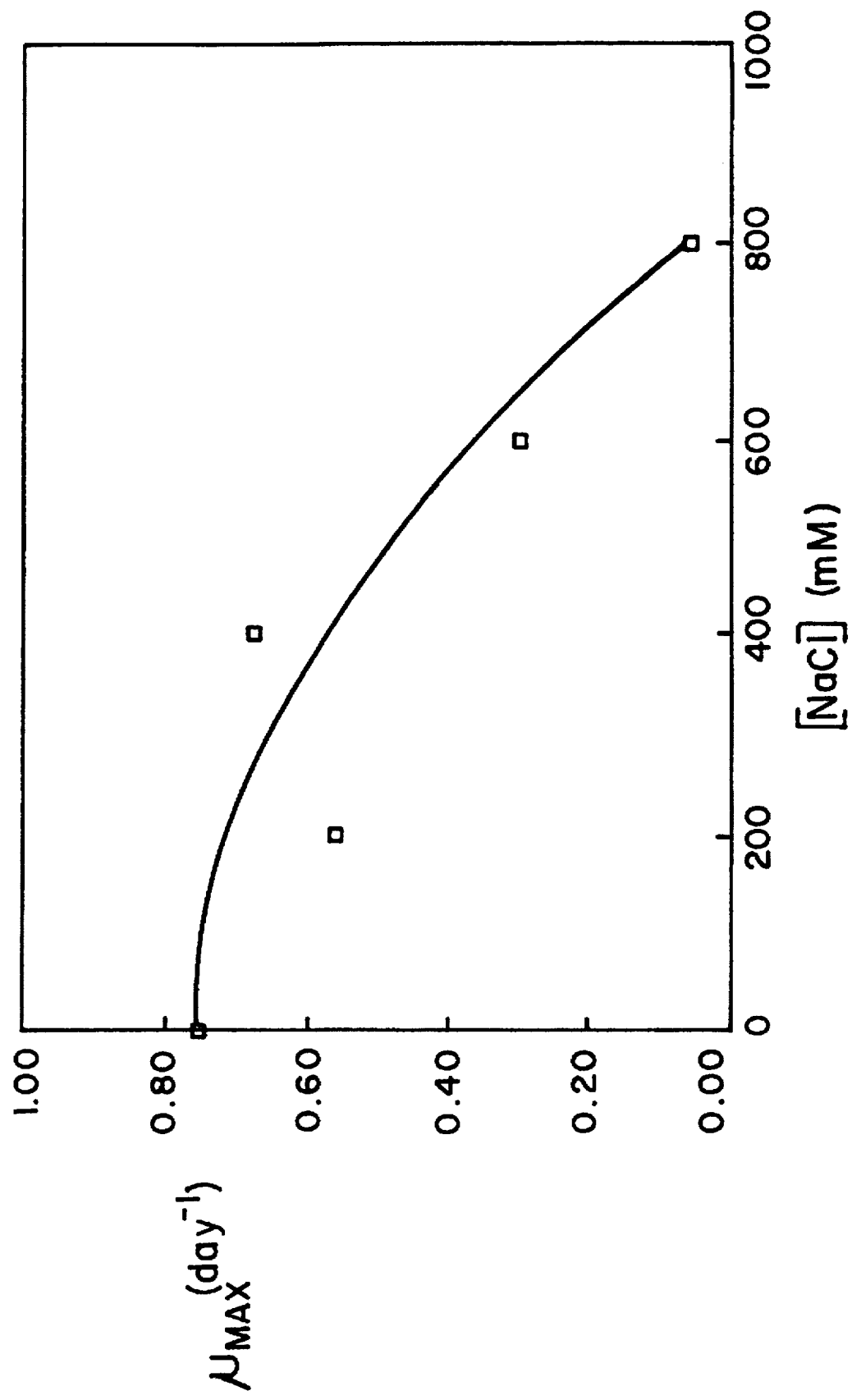
FIG. 3 shows the effect of an increasing NaCl concentration on the maximum growth rate.

FIG. 3 shows the effect of an increasing NaCl concentration on the maximum growth rate. It can be seen from FIG. 3 that at an NaCl concentration from about 800 mM the growth of the micro-organisms is substantially wholly suppressed, wherein the ratio R amounts to 2.7.

Figure 4:
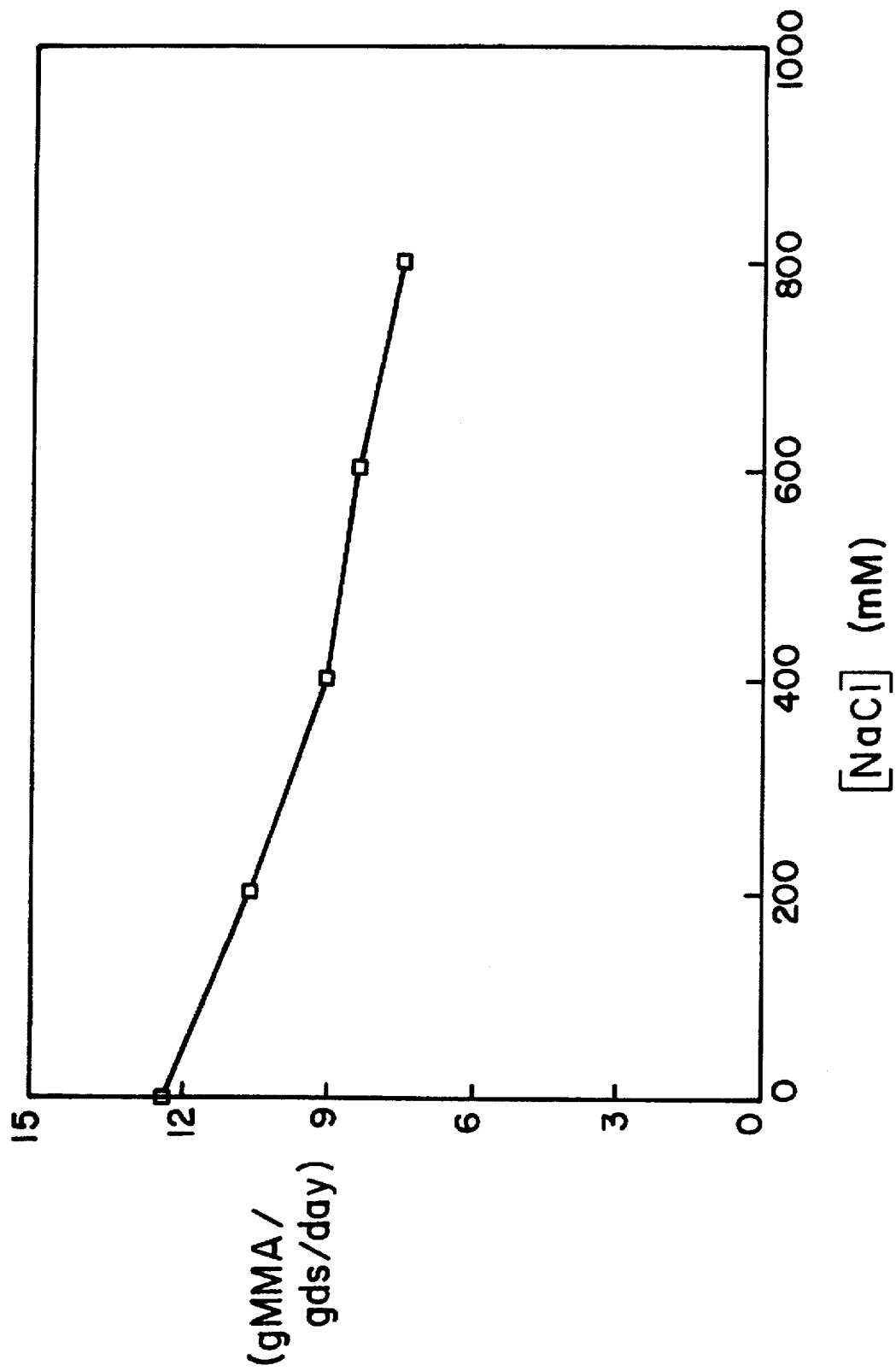
FIG. 4 shows a specific degradation rate for methyl methacrylate.

FIG. 4 shows that the specific degradation rate of methyl methacrylate (MMA) decreases at an increasing NaCl concentration, but that at 800 mM NaCl the micro-organisms still display a comparatively high degradation rate (roughly 60% of the specific degradation rate at 0 mM NaCl).

EXAMPLE 3

Similar experimental procedures as described in example 1 were carried out with a micro-organism culture which is capable of degrading dichloromethane (DCM) under aerobic conditions. This culture was an enriched culture and had developed in a continuously operated BTF which was initially inoculated with a pure culture of Hyphomicrobium. DCM was the only carbon source in an artificial off-gas flow.

Figure 5:
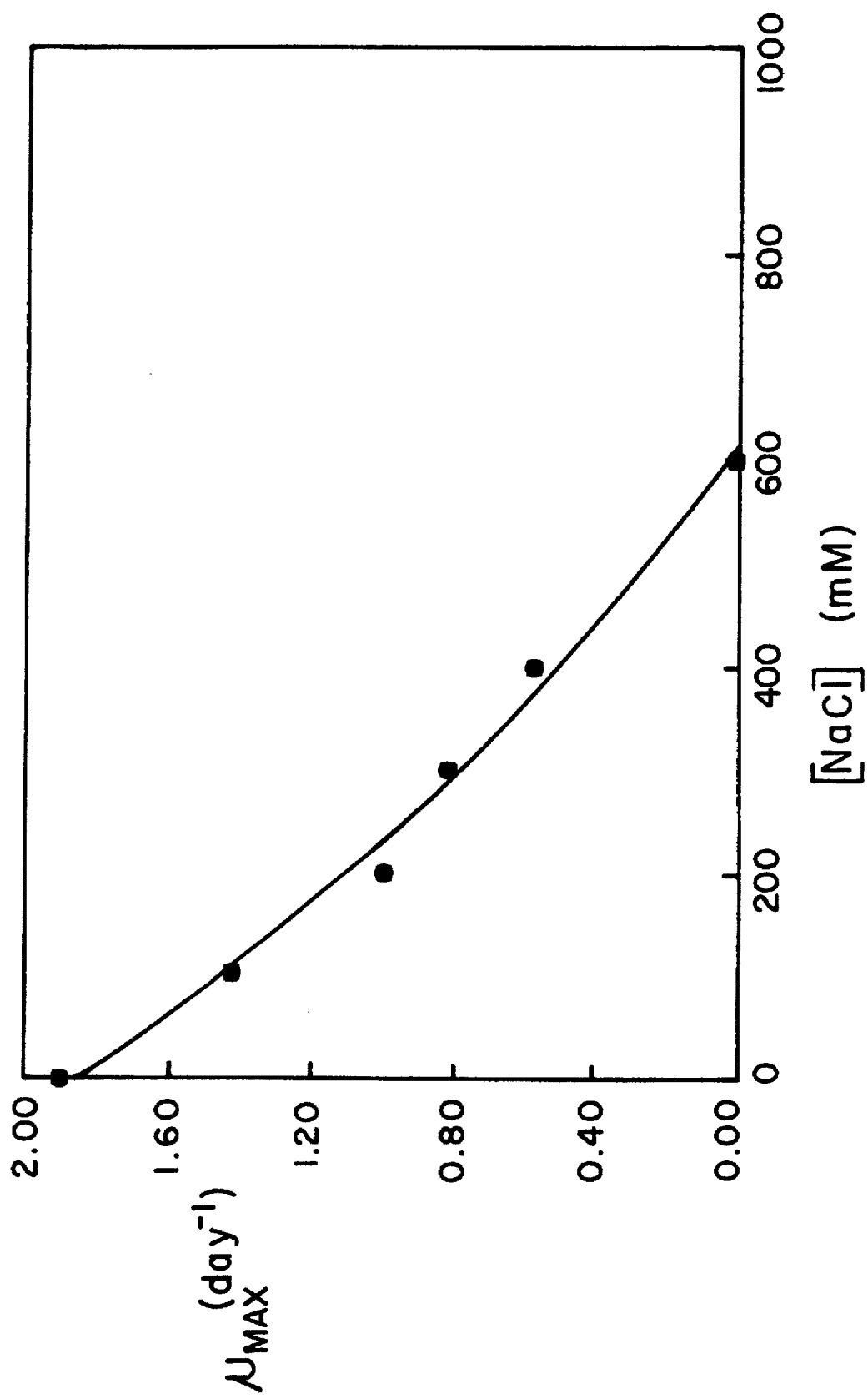
FIG. 5 shows a decrease in the maximum growth rate under specified process conditions.

FIG. 5 shows the decrease in the maximum growth rate at increasing NaCl concentration. The maximum growth rate falls from about 1.9 ($day^{-1}$) at 0 mM NaCl to practically complete inhibition of the growth at an NaCl concentration greater than or equal to 600 mM, wherein the ratio R amounts to 1.33.

Figure 6:
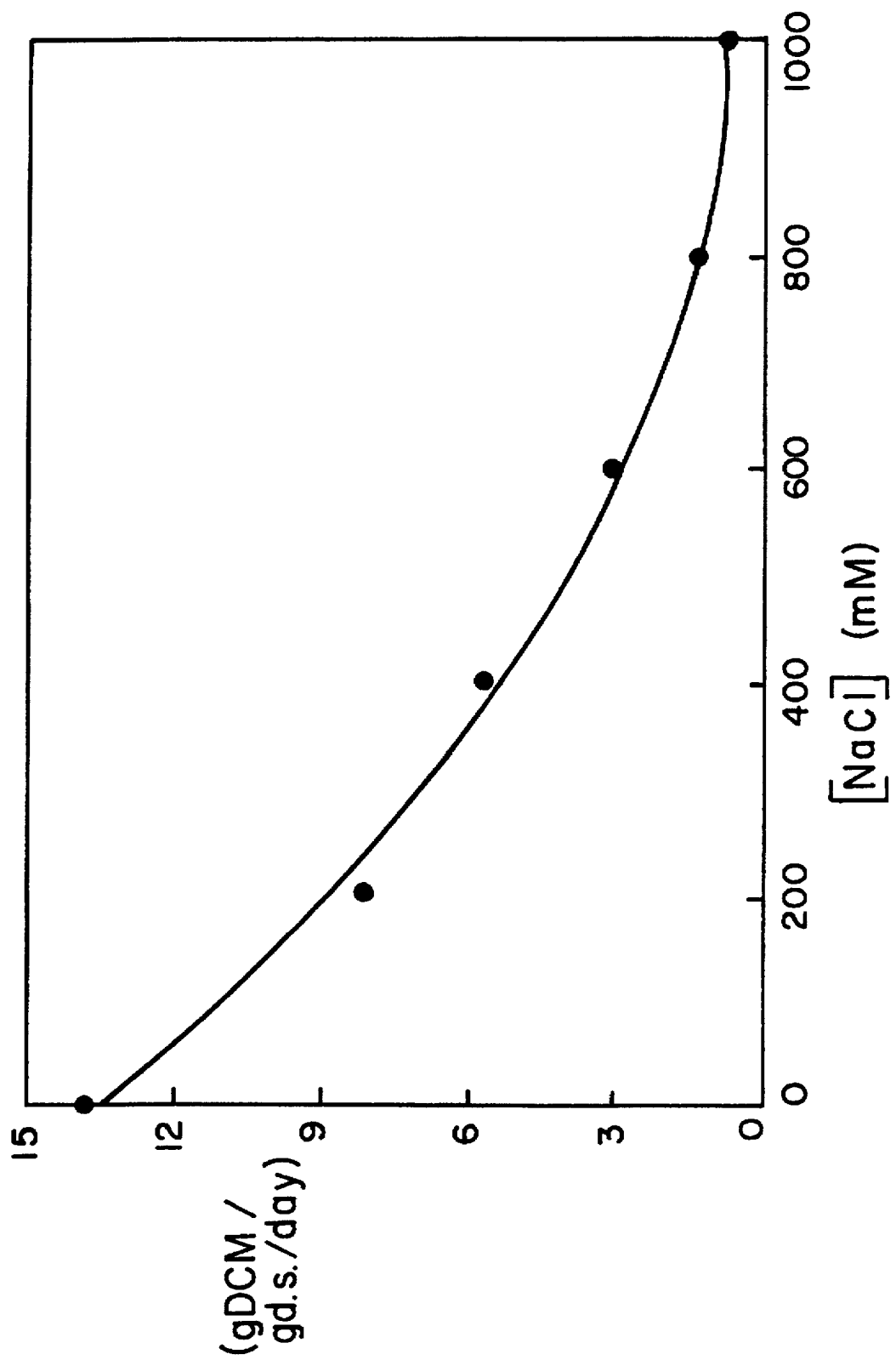
FIG. 6 shows the decrease in the specific degradation rate for dichloromethane under specified process conditions.
Figure 7:
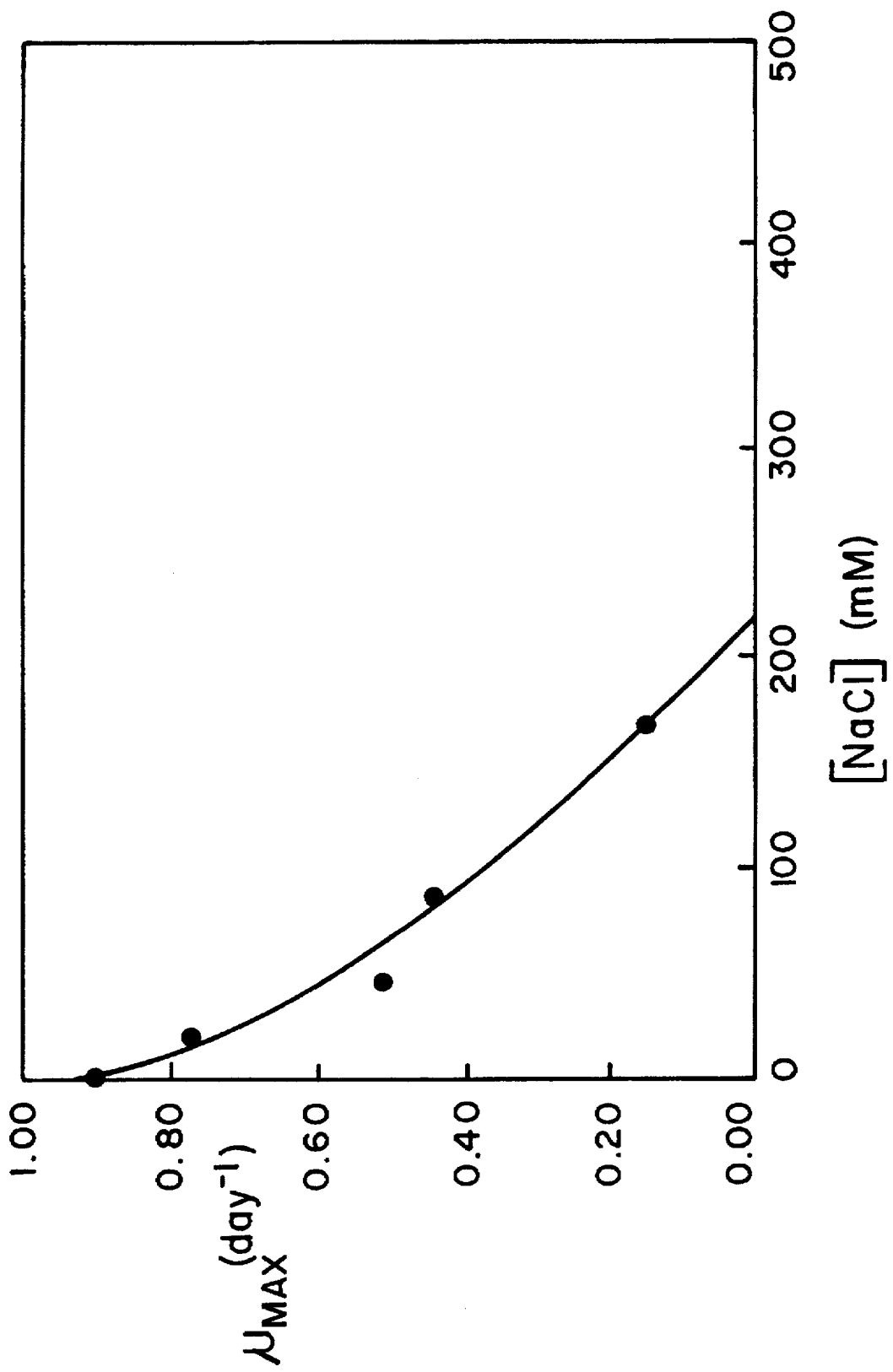
FIG. 7 shows the influence of an increasing NaCl concentration on the maximum growth of Xanthobacter autotrophicus under specified process conditions.
Figure 8:
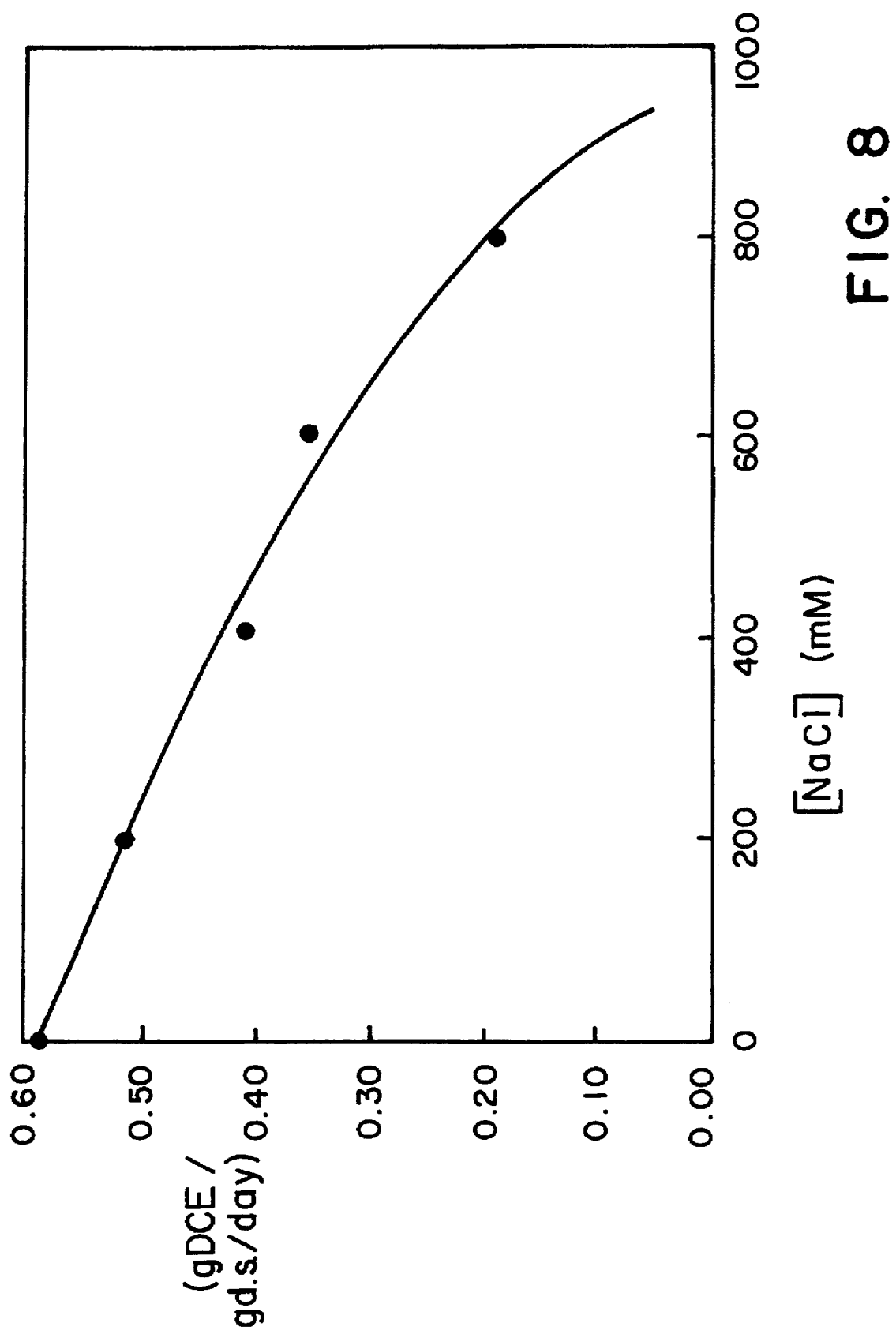
FIG. 8 shows the effect of an increasing NaCl concentration on the specific degradation rate of dichloroethane.

FIG. 6 shows the decrease in the specific degradation rate for DCM under the influence of an increasing NaCl concentration. Even at an NaCl concentration for a complete inhibition of the growth rate of the biomass a reasonable degradation rate still occurs, namely about 22% of the maximum specific degradation rate at an NaCl concentration of 0 mM.

EXAMPLE 4

Similar experimental procedures as described in example 1 were used with a micro-organism population capable of degrading 1,2-dichloroethane (DCE) and using it for its own growth.

The micro-organism population consisted of a pure culture of Xanthobacter autotrophicus. Use was further made of a mixed culture harvested from a BTF which was initially inoculated with a pure Xanthobacter autotrophicus culture which probably developed in the system under non-aseptic conditions into a heterogeneous microbial mass suitable for degrading DCE. Microscopic examination of this biomass showed that other microbial species and higher organisms were present in addition to Xanthobacter autotrophicus.

FIG. 7 shows the influence of an increasing NaCl concentration on the maximum growth of Xanthobacter autotrophicus on DCE. At an NaCl concentration between 200 and 250 mM the growth rate was completely inhibited.

FIG. 8 shows the effect of an increasing NaCl concentration on the specific degradation rate of DCE by the mixed culture. It can be seen from FIG. 8 that at a complete inhibition of the growth rate (200–250 mM NaCl) the specific degradation rate for DCE has decreased to a small extent (10–20%), wherein the ratio R amounts to 6.7.

We claim:

1. A method for biological cleaning of a gas flow containing at least one contaminant, comprising:

i) placing the gas flow containing contamination in contact with liquid, wherein the contamination is absorbed by the liquid and is degraded by micro-organisms in contact with the liquid; and ii) controlling a control salt concentration in the liquid such that the fractional inhibition of the growth rate of the micro-organisms is greater than the fractional decrease in the degradation rate of the contamination.

2. The method as claimed in claim 1, wherein the control salt comprises ions of alkali metal, earth alkali metal and polyvalent metals.

3. The method as claimed in claim 2, wherein the control salt is chosen from the group which comprises sodium salts, magnesium salts, calcium salts.

4. The method as claimed in claim 1, wherein the micro-organisms are adhered to a carrier material.

5. The method as claimed in claim 1, wherein the micro-organisms are dispersed in the liquid.

6. The method as claimed in claim 1, wherein the liquid is at least partly recirculated.

7. The method as claimed in claim 1, wherein a part of the liquid is drained and fresh liquid is added.

8. The method as claimed in claim 1, wherein the ratio of the fractional inhibition of the growth rate to the fractional decrease in the degradation rate is greater than 1.3, preferably greater than 1.5.

* * * * *

UNITED STATES PATENT AND TRADEMARK OFFICE
CERTIFICATE OF CORRECTION

PATENT NO.  : 5,637,498
DATED       : June 10, 1997
INVENTOR(S) : Simon P.P. Ottengraf et al.

It is certified that error appears in the above-indentified patent and that said Letters Patent is hereby corrected as shown below:

Column 1 Line 5 "related" should read --relates--.

Column 1 Line 14 "ore" should read --are--.

Column 2 Line 27 "rake" should read --rate--.

Column 2 Line 32 "he" should read --be--.

Column 3 Line 44 "pro-culture" should read --pre-culture--.

Column 3 Line 51 "pro-culture" should read --pre-culture--.

Signed and Sealed this

Sixteenth Day of September, 1997

Attest:

BRUCE LEHMAN

Attesting Officer

Commissioner of Patents and Trademarks